Dec. 24, 1968   O. E. SUDHOFF   3,417,554
POWER RAKE FOR REMOVING DEAD GRASS IN LAWNS
Filed Aug. 15, 1966   2 Sheets-Sheet 1
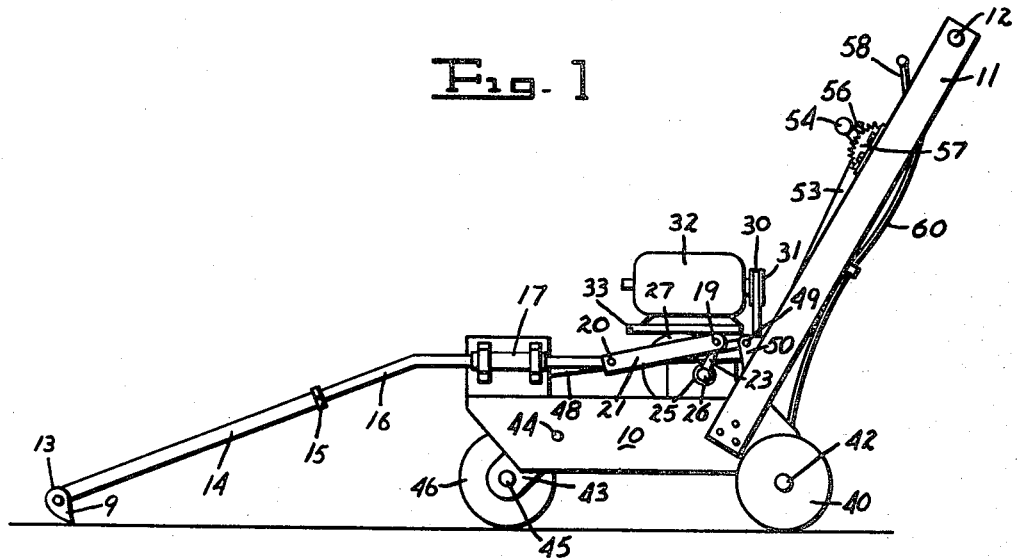
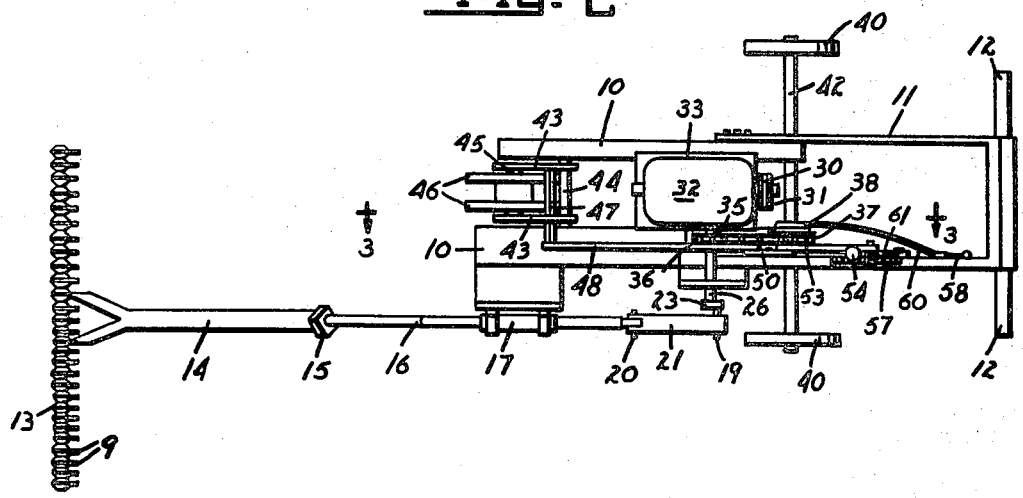
INVENTOR.
OTTO E. SUDHOFF
BY
ATTYS.

Dec. 24, 1968    O. E. SUDHOFF    3,417,554
POWER RAKE FOR REMOVING DEAD GRASS IN LAWNS
Filed Aug. 15, 1966    2 Sheets-Sheet 2
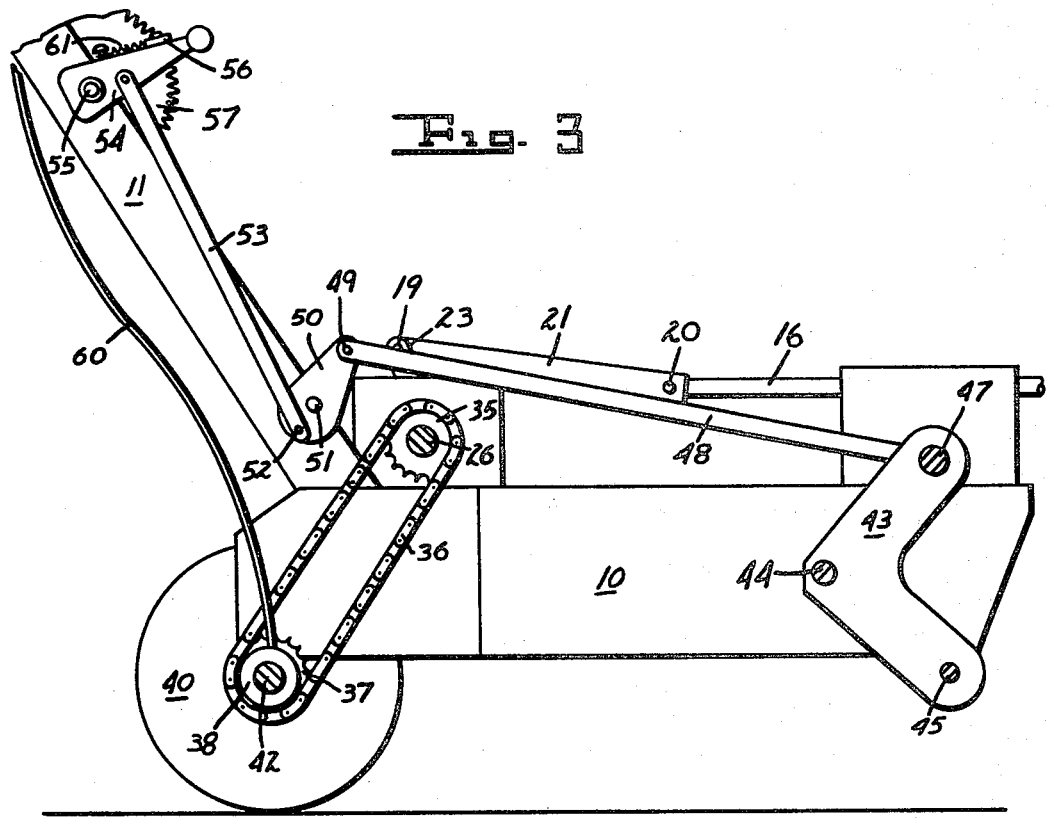
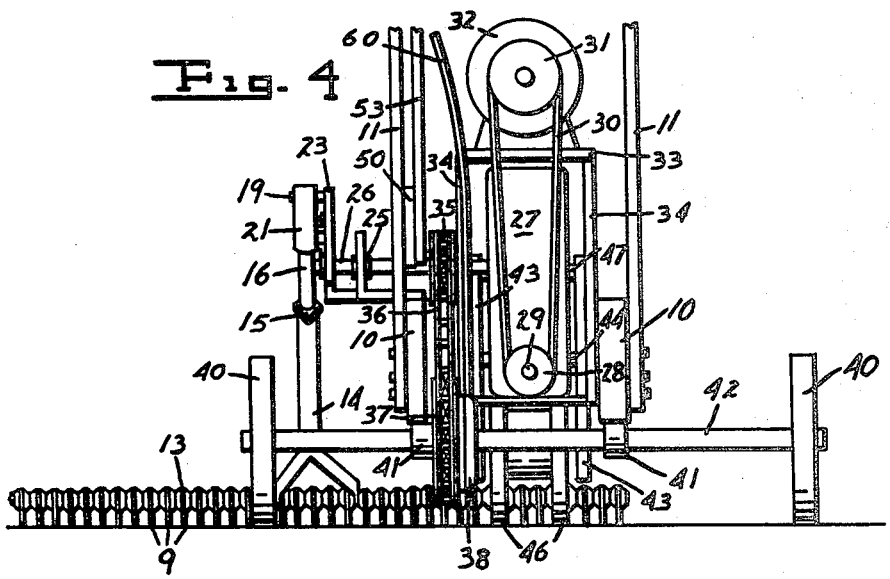
INVENTOR.
OTTO E. SUDHOFF
BY
Wells & St John
ATTYS.

United States Patent Office 3,417,554
Patented Dec. 24, 1968

3,417,554
POWER RAKE FOR REMOVING DEAD
GRASS IN LAWNS
Otto E. Sudhoff, W. 3114 Glass,
Spokane, Wash. 99205
Filed Aug. 15, 1966, Ser. No. 572,358
5 Claims. (Cl. 56—27)

This invention relates to a power rake for removing dead grass in lawns.

The removal of dead grass or "thatch" from lawns is widely recognized as a desirable or even necessary phase of proper lawn cultivation. This procedure is typically carried out in the spring, following heavy summer growth and subsequent winter damage to the lawn. Raking of the lawn removes dead and decaying matter which mats about the roots of the grass plants, thins the plant roots and stems and sets the growing plants in an erect position. Machines are available for removing such thatch, but most utilize revolving blades or teeth which tear at the lawn surface and which typically either dig into the soil a greater distance than necessary or ride above the surface and leave areas not properly cultivated.

The present device provides a power unit for moving a reciprocating rake which is self cleaning, the rake being reciprocated through a lawn area. The reciprocating rake is capable of removing thatch and dead material from the lawn without damaging the plants themselves. Power is provided for both the rake and the vehicle, the latter being supported on wheels independent of the raking mechanism.

It is a first object of this invention to provide an economical apparatus for powering a reciprocable lawn rake. The apparatus further provides ready adjustment of raking depth and easy substitution of the rake for repair or other purposes.

Further objects will be evident from the following disclosure, which sets out in detail one example of the invention, which is not to be taken as a limiting example.

In the drawings:

FIGURE 1 is a side elevation view of the power rake;

FIGURE 2 is a plan view of the power rake as seen from the top of FIGURE 1;

FIGURE 3 is an enlarged fragmentary sectional view taken along line 3—3 in FIGURE 2; and FIGURE 4 is an enlarged fragmentary rear elevation of the apparatus as seen from the right in FIGURE 1.

Referring now to the drawings, the component parts of the apparatus are mounted on a pair of longitudinal rectangular frame members 10 (FIGURES 1 and 2). Fixed to the rear ends of frame members 10 is an upwardly and rearwardly extending handle 11 which is provided with handle grips 12 at its upper end. The handle 11 provides the means by which an operator can guide and control the power rake.

Located at the front of the apparatus is a rake 13 consisting of parallel and downwardly projecting teeth 9 which are transversely aligned. Each tooth has a convex forward edge and concave rear edge which converge at its lower end. Fixed to rake 13 is a Y-shaped tubular stem in the form of a rod 14 which extends upwardly and rearwardly from the rake. The rod 14 has fixed to its upper end a nut 15 which is threaded onto a rod 16, permitting rake 13 to be removed from the apparatus for repair. The rod 16 is slidably carried in a bearing 17 fixed to the forward end of one of the frame members 10. The forward end of rod 16 is bent downwardly slightly so as to position rod 14 and rake 13 at an effective angle for pulling dead grass from lawns.

The rear end of rod 16 is pivotally connected at 20 to one end of a reciprocating and vertically moving link 21.

Link 21 is pivoted at 19 to a rotating arm 23. The arm 23 is fixed to the end of a rotating shaft 26 supported in a bearing 25 on one frame member 10. The opposite end of shaft 26 has fixed to it a gear that is engaged by a worm gear. This worm and gear transmission is of conventional type and is supported in a housing 27 carried on parallel frame members 10 (FIGURES 1 and 4).

The worm gear carried in housing 27 has fixed to it a shaft 29 extending rearwardly from the housing and carrying a pulley 28. The pulley 28 is engaged by an endless V-belt 30 that is also carried by a drive pulley 31 located directly above lower pulley 28. The drive pulley 31 is fixed to the drive shaft of an electric motor 32 which is actuated by a suitable connection to a source of electric current. The motor is bolted to a horizontal mounting plate 33 carried on frame members 10 by means of vertical supports 34. It is to be understood that a gas operated engine could be easily substituted for the electric motor 32.

The motor 32 also serves to drive the power rake forward over the lawn by means of a drive sprocket 35 fixed to continuously rotating shaft 26 (FIGURES 2, 3 and 4). An endless chain 36 passes over drive sprocket 35 and then over a second sprocket 37 carried on rear axle 42. The axle 42 which is rotatably carried in bearings 41 fixed to each frame member 10 has fixed to either end wheels 40 that engage the ground and support the rear of the apparatus. A clutch 38 is carried on axle 42 which when engaging sprocket 37 causes the axle 42 to rotate and drive the apparatus forward. When the clutch 38 is disengaged the sprocket 37 freely rotates on the axle 42 and the device will not be driven forward. The clutch 38 is manually operated by a lever 58 mounted on the upper part of handle 11 and connected to clutch 38 by a cable 60.

Fixed between frame members 10 near their forward ends is a shaft 44 that pivotally carries two crank arms 43 (FIGURE 3). A shaft 45 fixed between the lower ends of crank arms 43 serves to rotatably carry a pair of ground engaging wheels 46 that support the front end of the apparatus. The upper ends of crank arms 43 are connected by a transverse shaft 47 which has one end pivotally attached to a link 48. The link 48 extends rearwardly and upwardly toward handle 11 where it is pivotally connected at 49 to a crank arm 50. The crank arm 50 is pivotally mounted on a shaft 51 which is fixed to handle 11. Located at the opposite end of crank arm 50 from pivot 49 is a second pivot 52 for a link 53. The link 53 extends upwardly along one side of handle 11 and is pivotally connected to a lever 54. The lever 54 is pivotally connected at 55 to one side of handle 11 and pivotally carries a pawl 56. A rack 57 fixed to the same side of handle 11 as lever 54 serves to engage pawl 56 and lock the lever 54 in various positions about pivot 55. The pawl 56 is forced against the rack 57 by a spring 61 fixed between the pawl and lever 54.

When lever 54 is manually moved to various positions about pivot 55 the crank arms 43 are caused to pivot about shaft 44 and lower or raise the front of the power rake relative to the ground. This arrangement for lowering and raising the front of the apparatus permits adjustment of raking depth and also permits more or less of the frame weight to be applied to the rake 13 to force it against the ground, to thereby prevent it from riding over dead grass to be removed.

In order to operate the power rake motor 32 is first connected to a suitable electrical outlet thus causing the movement of the worm and gear arrangement and the rotation of shaft 26 and arm 23. The rotation of arm 23 causes the reciprocating and vertical movement of link 21. The reciprocating movement of link 21 causes the fore and aft movement of rod 16 and the rake 13. The dead grass is pulled from the lawn by the rake 13 as it moves toward the frame or to the right in FIGURE 1. On its return or forward stroke the convex front edge of the rake teeth ride freely over the ground surface.

The apparatus can be moved forward manually or by use of the chain drive arrangement on continuously rotating shaft 26. The drive sprocket 35 continuously rotates with the shaft 26 and causes chain 36 and sprocket 37 on rear axle 42 to move continuously. The continuously moving sprocket 37 rotates axle 42 when lever 58 is manually operated to engage clutch 38 and sprocket 37. The speed at which the apparatus moves forward is slow enough to provide efficient raking without skips and fast enough to prevent unnecessary reraking of an area.

Various modifications may be made in the practice of this invention without deviating from its basic scope as defined in the following claims. Therefore, only these claims are intended to limit or restrict the scope of this invention.

Having thus described my invention, I claim:

1. A power rake adapted to be steered by a walking attendant, comprising:
   a ground supported mobile frame having a handle;
   a transverse rake member having downwardly directed teeth and an integral stem movably supported on said frame for longitudinal motion relative to said frame;
   a power source on said frame;
   and means interconnecting said power source and the stem of said rake to reciprocate the stem and rake longitudinally relative to said frame.

2. A power rake as set out in claim 1 wherein the rake is located forward of said frame, the stem of said rake extending upwardly and rearwardly from the teeth thereof, and being bent to present a substantially horizontal section slidably guided by said frame.

3. A power rake as set out in claim 1 wherein the rake is located forward of said frame, the stem of said rake extending upwardly and rearwardly from the teeth thereof, and being bent to present a substantially horizontal section slidably guided by said frame;
   said frame being carried by front and rear ground engaging wheels;
   and means operatively connected between said frame and the front wheels to vary the front elevation of the frame relative to the ground to thereby vary the pressure transferred from the frame to the rake though the supporting stem.

4. A power rake as set out in claim 1 wherein said power source comprises:
   a motor having an output member;
   a transverse shaft rotatably mounted on said frame;
   drive means operatively connected between said motor output member and said shaft;
   a radial crank arm fixed to said shaft;
   and a rigid link pivotally connected about parallel transverse axes at its ends to said crank arm and rake stem respectively.

5. A power rake as set out in claim 1 wherein said frame is carried by ground engaging wheels, further comprising:
   selectively engageable drive means operatively connected between said power source and said wheels to rotate said wheels and thereby move the frame relative to the ground surface.

References Cited

UNITED STATES PATENTS

| | | | |
|---|---|---|---|
| 520,422 | 5/1894 | Bell et al. | 56—362 |
| 715,427 | 12/1902 | Schubert | 56—362 |
| 2,751,741 | 6/1956 | Carson | 56—27 |
| 2,898,724 | 8/1959 | Robinson | 56—27 |
| 3,217,474 | 11/1965 | Neilson | 56—27 |

RUSSELL R. KINSEY, *Primary Examiner.*